United States Patent
Fukushima (10) Patent No.: US 9,143,940 B2
(45) Date of Patent: Sep. 22, 2015

(54) WIRELESS COMMUNICATION SYSTEM, PORTABLE TERMINAL, DIGITAL CAMERA, COMMUNICATION METHOD, AND COMPUTER-READABLE STORAGE DEVICE

(71) Applicant: OLYMPUS CORPORATION, Tokyo (JP)

(72) Inventor: Keito Fukushima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 43 days.

(21) Appl. No.: 13/973,021

(22) Filed: Aug. 22, 2013

(65) Prior Publication Data

US 2014/0115674 A1    Apr. 24, 2014

(30) Foreign Application Priority Data

Oct. 18, 2012    (JP) .................................. 2012-230950

(51) Int. Cl.
*H04L 29/06* (2006.01)
*H04W 12/06* (2009.01)
*H04W 12/04* (2009.01)

(52) U.S. Cl.
CPC .............. *H04W 12/06* (2013.01); *H04W 12/04* (2013.01)

(58) Field of Classification Search
CPC .................................. H04L 9/32; H04W 12/08
USPC .......................................................... 726/3–6
See application file for complete search history.

(56) References Cited

U.S. PATENT DOCUMENTS

| | | | | |
|---|---|---|---|---|
| 8,806,567 | B1 * | 8/2014 | Venable, Sr. ...................... | 726/1 |
| 2013/0091548 | A1 * | 4/2013 | Song ................. | 726/4 |
| 2013/0223279 | A1 * | 8/2013 | Tinnakornsrisuphap et al. .............................. | 370/254 |
| 2013/0276075 | A1 * | 10/2013 | Gong et al. ....................... | 726/5 |
| 2013/0305329 | A1 * | 11/2013 | Zhang ............................... | 726/6 |
| 2014/0001253 | A1 * | 1/2014 | Smith ............................ | 235/375 |

(Continued)

FOREIGN PATENT DOCUMENTS

| | | |
|---|---|---|
| JP | 2005-080150 A | 3/2005 |
| JP | 2005-142907 A | 6/2005 |

(Continued)

OTHER PUBLICATIONS

Japanese Office Action dated Oct. 14, 2014, issued in corresponding JP Application No. 2012-230950 with English translation (6 pages).

*Primary Examiner* — Justin T Darrow
*Assistant Examiner* — Hee Song
(74) *Attorney, Agent, or Firm* — Westerman, Hattori, Daniels & Adrian, LLP (57) ABSTRACT

A generation unit generates the wireless network connection setting information from the first information based on the conversion rule. The encoding unit encodes the first information to generate a code image. A display unit displays the code image. An imaging unit captures the code image. A decoding unit decodes the code image captured by the imaging unit and acquires the first information. A second storage unit stores a conversion rule that is the same as the conversion rule stored in the storage unit. A second generation unit generates the wireless network connection setting information from the first information acquired by the decoding unit based on the conversion rule stored in the second storage unit. A communication unit connects to a wireless network using the wireless network connection setting information generated by the second generation unit.

16 Claims, 6 Drawing Sheets

(56) References Cited

U.S. PATENT DOCUMENTS

| | | | |
|---|---|---|---|
| 2014/0056171 A1* | 2/2014 | Clegg | 370/254 |
| 2014/0068719 A1* | 3/2014 | Kiukkonen et al. | 726/4 |
| 2014/0068727 A1* | 3/2014 | Shamis et al. | 726/5 |

FOREIGN PATENT DOCUMENTS

| | | |
|---|---|---|
| JP | 2005-286439 A | 10/2005 |
| JP | 2006-121185 A | 5/2006 |
| JP | 2006-157815 A | 6/2006 |
| JP | 2006-261938 A | 9/2006 |
| JP | 2007-034778 A | 2/2007 |
| JP | 2007-134996 A | 5/2007 |
| JP | 2007-251718 A | 9/2007 |
| JP | 2007-324926 A | 12/2007 |
| JP | 2008-211507 A | 9/2008 |
| JP | 2009-513089 A | 3/2009 |
| JP | 2009-141472 A | 6/2009 |
| JP | 2009-267578 A | 11/2009 |
| JP | 2011-055127 A | 3/2011 |
| JP | 2011-205486 A | 10/2011 |
| WO | 2007/078940 A2 | 7/2007 |

* cited by examiner

WIRELESS COMMUNICATION SYSTEM, PORTABLE TERMINAL, DIGITAL CAMERA, COMMUNICATION METHOD, AND COMPUTER-READABLE STORAGE DEVICE

BACKGROUND OF THE INVENTION

1. Field of the Invention

The present invention relates to a wireless communication system, a portable terminal, a digital camera, a communication method, and a computer-readable storage device.

Priority is claimed on Japanese Patent Application No. 2012-230950, filed Oct. 18, 2012, the content of which is incorporated herein by reference.

2. Description of Related Art

Conventionally, a scheme for simplifying the setting of a wireless network connection has been known. For example, a method for capturing and decoding a barcode obtained by encoding wireless network connection setting information (a network identifier (SSID) and a pass phrase) that is used when connecting to a wireless network, and connecting to the wireless network using the decoded wireless network connection setting information (for example, refer to Japanese Unexamined Patent Application, First Publication No. 2005-286439, Japanese Unexamined Patent Application, First Publication No. 2006-157815, Japanese Unexamined Patent Application, First Publication No. 2006-261938, Japanese Unexamined Patent Application, First Publication No. 2007-034778, Japanese Unexamined Patent Application, First Publication No. 2007-324926, Japanese Unexamined Patent Application, First Publication No. 2008-211507, Japanese Unexamined Patent Application, First Publication No. 2009-141472, and Japanese Unexamined Patent Application, First Publication No. 2011-205486) has been known.

Furthermore, for example, technology for enhancing the security of the wireless network connection setting information using a barcode obtained by encoding information obtained by encrypting the wireless network connection setting information by a security key (an encryption key, authentication information) (for example, refer to Japanese Unexamined Patent Application, First Publication No. 2006-121185, Japanese Unexamined Patent Application, First Publication No. 2007-251718, and Japanese Unexamined Patent Application, First Publication No. 2011-055127) has been known.

SUMMARY OF THE INVENTION

According to a first aspect of the present invention, a wireless communication system includes a first storage unit configured to store first information, which is used to generate wireless network connection setting information that is used to connect to a wireless network, and a conversion rule of the first information and the wireless network connection setting information, a first generation unit configured to generate the wireless network connection setting information from the first information, which is stored in the first storage unit, based on the conversion rule stored in the first storage unit, an encoding unit configured to encode the first information to generate a code image, a display unit configured to display the code image generated by the encoding unit, an imaging unit configured to capture the code image displayed on the display unit, a decoding unit configured to decode the code image captured by the imaging unit and acquires the first information, a second storage unit configured to store a conversion rule that is the same as the conversion rule stored in the first storage unit, a second generation unit configured to generate the wireless network connection setting information from the first information, which is acquired by the decoding unit, based on the conversion rule stored in the second storage unit, a communication unit configured to transmit a connection request for connecting to the wireless network using the wireless network connection setting information generated by the second generation unit, and a second communication unit configured to perform a process of connecting to the wireless network in response to the connection request.

According to a second aspect of the present invention, the wireless communication system of the first aspect further includes a digital camera and a portable terminal, wherein the digital camera includes the first storage unit, the first generation unit, the encoding unit, the display unit, and the second communication unit; and the portable terminal includes the imaging unit, the decoding unit, the second storage unit, the second generation unit, and the communication unit.

According to a third aspect of the present invention, in the wireless communication system of the first aspect, the wireless communication system further includes a digital camera, a portable terminal, and a server, wherein the digital camera includes the first storage unit, the first generation unit, the encoding unit, the display unit, and the second communication unit, the portable terminal including the imaging unit, the decoding unit, and the communication unit, wherein the communication unit is further configured to transmit the first information acquired by the decoding unit to the server, the server includes a reception unit configured to receive the first information that is transmitted from the communication unit, the second storage unit, the second generation unit and a transmission unit configured to transmit the wireless network connection setting information generated by the second generation unit to the portable terminal, the communication unit further receives the wireless network connection setting information that is transmitted from the transmission unit.

According to a fourth aspect of the present invention, in the wireless communication system of the first to third aspects, when the first information decoded by the decoding unit is not a predetermined value, the communication unit stops a process of transmitting the connection request.

According to a fifth aspect of the present invention, the wireless communication system of the fourth aspect further includes a second display unit configured to display an alarm for alerting that the process has stopped when the communication unit stops the process of transmitting the connection request.

Furthermore, according to a sixth aspect of the present invention, a portable terminal includes an imaging unit which captures a code image, which is obtained by encoding first information, which can be used to generate, when conversion based on a predetermined conversion rule is performed, wireless network connection setting information that is used to connect to a wireless network, a decoding unit configured to decode the code image captured by the imaging unit so as to acquire the first information, a terminal storage unit configured to store a conversion rule that is the same as the predetermined conversion rule, a terminal generation unit configured to generate the wireless network connection setting information from the first information, which is acquired by the decoding unit, based on the conversion rule stored in the terminal storage unit, and a communication unit configured to transmit a connection request for connecting to the wireless network using the wireless network connection setting information generated by the terminal generation unit.

According to a seventh aspect of the present invention, in the portable terminal of the sixth aspect, when the first information decoded by the decoding unit is not a predetermined value, the communication unit stops a process of transmitting the connection request.

According to an eighth aspect of the present invention, the portable terminal of the sixth aspect further includes a display unit configured to display an alarm for alerting that the process is stopped when the communication unit stops the process of transmitting the connection request.

Furthermore, according to a ninth aspect of the present invention, a digital camera includes: a first storage unit configured to store first information, which is used to generate wireless network connection setting information that is used to connect to a wireless network, and a conversion rule of the first information and the wireless network connection setting information, a first generation unit configured to generate the wireless network connection setting information from the first information, which is stored in the first storage unit, based on the conversion rule stored in the first storage unit, an encoding unit configured to encode the first information to generate a code image, a display unit configured to display the code image generated by the encoding unit, and a communication unit configured to receive a connection request to the wireless network and performs a process of connecting to the wireless network in response to the connection request.

Furthermore, according to a tenth aspect of the present invention, a communication method includes an imaging step of capturing a code image, which is obtained by encoding first information, which is used to generate, when conversion based on a predetermined conversion rule is performed, wireless network connection setting information that can be used to connect to a wireless network, a decoding step of decoding the code image captured in the imaging step and acquiring the first information, a generation step of generating the wireless network connection setting information from the first information, which is acquired in the decoding step, based on a conversion rule that is stored in a terminal storage unit which stores the conversion rule that is the same as the predetermined conversion rule, and a communication step of transmitting a connection request for connecting to the wireless network using the wireless network connection setting information generated in the generation step.

Furthermore, according to an eleventh aspect of the present invention, a communication method includes: a generation step of generating wireless network connection setting information from first information, which is stored in a first storage unit, based on a conversion rule stored in the first storage unit that stores the wireless network connection setting information that is used to connect to a wireless network, the first information that is used to generate the wireless network connection setting information, and the conversion rule stored in the first storage unit which stores the conversion rule of the first information and the wireless network connection setting information, an encoding step of encoding the first information to generate a code image, a display step of displaying the code image generated in the encoding step, and a communication step of receiving a connection request to the wireless network and performing a process of connecting to the wireless network in response to the connection request.

Furthermore, according to a twelfth aspect of the present invention, a computer-readable storage device that records a program for causing a computer including an imaging unit to perform an imaging step of capturing, by the imaging unit, a code image, which is obtained by encoding first information, which can be used to generate wireless network connection setting information that is used to connect to a wireless network when conversion based on a predetermined conversion rule is performed a decoding step of decoding the code image captured by the imaging unit in the imaging step and acquiring the first information; a generation step of generating the wireless network connection setting information from the first information, which is acquired in the decoding step, based on a conversion rule that is stored in a terminal storage unit which stores the conversion rule that is the same as the predetermined conversion rule, and a communication step of transmitting a connection request for connecting to the wireless network using the wireless network connection setting information generated in the generation step.

Furthermore, according to a thirteenth aspect of the present invention, a computer-readable storage device that records a program for causing a computer to perform a generation step of generating wireless network connection setting information from first information, which is stored in a first storage unit, based on a conversion rule stored in the first storage unit that stores the wireless network connection setting information that is used to connect to a wireless network, the first information that is used to generate the wireless network connection setting information, and the conversion rule stored in the first storage unit which stores the conversion rule between the first information and the wireless network connection setting information, an encoding step of encoding the first information to generate a code image, a display step of displaying the code image generated in the encoding step, and a communication step of receiving a connection request to the wireless network and performing a process of connecting to the wireless network in response to the connection request.

DETAILED DESCRIPTION OF THE INVENTION

First Embodiment

Hereinafter, with reference to the accompanying drawings, a first embodiment of the present invention will be described.

The present embodiment will be described using an example in which a portable terminal connects to a wireless network of a digital camera. Furthermore, in the present embodiment, the digital camera generates wireless network connection setting information, such as a network identifier (SSID) and a password (a pass phrase), which is used when the portable terminal connects to the wireless network. A system including the digital camera and the portable terminal will be referred to as a wireless communication system.

Figure 1:
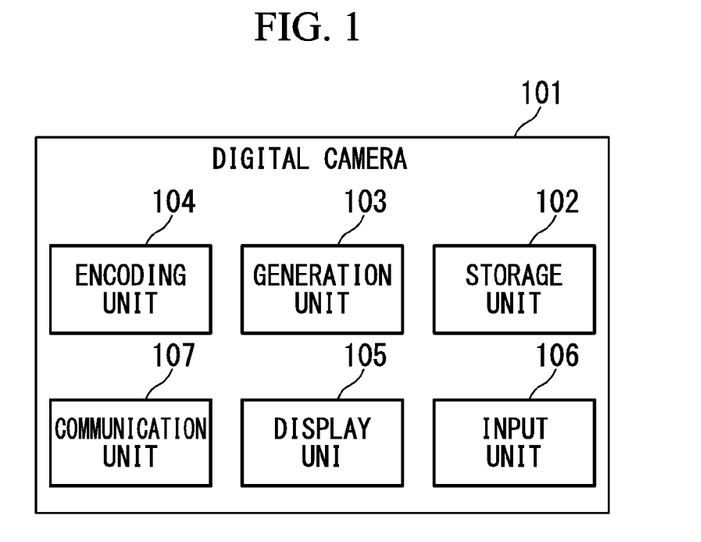
FIG. 1 is a block diagram illustrating the constitution of a digital camera in a first embodiment of the present invention.

FIG. 1 is a block diagram illustrating the constitution of a digital camera 101 in the first embodiment of the present invention. In the illustrated example, the digital camera 101 includes a storage unit 102 (a first storage unit), a generation unit 103 (a first generation unit), an encoding unit 104, a display unit 105, an input unit 106, and a communication unit 107 (a communication unit, a second communication unit).

The storage unit 102 stores wireless network connection setting information, such as a network identifier (SSID) and a password (a pass phrase), or information (first information) for generating "wireless network connection setting information" that is used when generating the wireless network connection setting information. Furthermore, the storage unit 102 stores a predetermined generation rule for generating the wireless network connection setting information. Furthermore, the storage unit 102 also stores a control program for comprehensively controlling the operations of the elements provided in the digital camera 101, data that is transmitted/received by the communication unit 107, image data captured by an imaging unit (not illustrated), and the like.

The generation unit 103 generates the wireless network connection setting information from the information for generating "wireless network connection setting information" according to the predetermined generation rule stored in the storage unit 102. The encoding unit 104 encodes a code image, such as a two-dimensional bar code, using the information for generating "wireless network connection setting information".

The display unit 105 displays the code image encoded by the encoding unit 104. Furthermore, the display unit 105 displays image data read from the storage unit 102, a user interface screen and the like. The input unit 106 accepts input of an instruction (a trigger) from a user through the display unit 105, or a user interface such as a switch, a hardware key, or a touch panel (not illustrated).

The communication unit 107 is a communication interface that performs data transmission/reception with an external apparatus including a portable terminal. In the present embodiment, the communication unit 107 performs data transmission/reception with an external apparatus using a wireless LAN (WLAN). Furthermore, when performing wireless communication with a portable terminal, the communication unit 107 functions as an access point of the wireless LAN, thereby creating a wireless network. Although not illustrated in the drawing, the digital camera 101 includes a control unit. The control unit comprehensively controls the operations of the elements provided in the digital camera 101 based on the control program stored in the storage unit 102. In expressing the present invention, indispensable elements of the digital camera 101 are the storage unit 102, the generation unit 103, the encoding unit 104, the display unit 105, and the communication unit 107.

Figure 2:
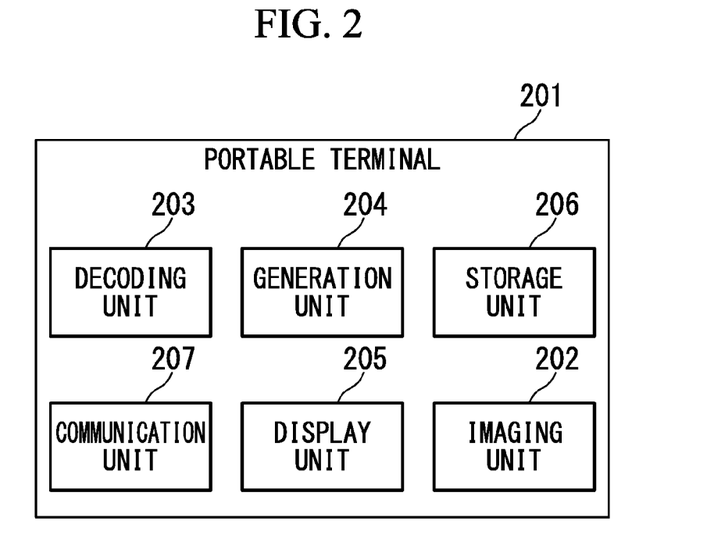
FIG. 2 is a block diagram illustrating the constitution of a portable terminal in the first embodiment of the present invention.

FIG. 2 is a block diagram illustrating the constitution of a portable terminal 201 in the present embodiment. In the illustrated example, the portable terminal 201 includes an imaging unit 202, a decoding unit 203, a generation unit 204 (a second generation unit, a terminal generation unit), a display unit 205 (a second display unit), a storage unit 206 (a second storage unit, a terminal storage unit), and a communication unit 207.

The imaging unit 202 generates an imaging signal by capturing an object, and creates image data by performing various types of image processing. The decoding unit 203 decodes image data (a code image) such as a two-dimensional bar code, which has been captured by the imaging unit 202, into information such as a numerical value or text.

The storage unit 206 stores a predetermined generation rule for generating wireless network connection setting information. Furthermore, the storage unit 206 stores wireless network connection setting information generated by the generation unit 204. Furthermore, the storage unit 206 also stores a control program for comprehensively controlling operations of the elements provided in the portable terminal 201, data that is transmitted/received by the communication unit 207, image data captured by the imaging unit 202, and the like. The predetermined generation rule for generating the wireless network connection setting information, which is stored in the storage unit 206, is the same as the predetermined generation rule for generating the wireless network connection setting information, which is stored in the storage unit 102 of the digital camera 101.

The generation unit 204 generates the wireless network connection setting information from information decoded by the decoding unit 203 according to the predetermined generation rule for generating the wireless network connection setting information, which is stored in the storage unit 206. The display unit 205 displays the image data, a user interface screen and the like, which are stored in the storage unit 206.

The communication unit 207 is a communication interface that performs data transmission/reception with an external apparatus including the digital camera 101. In the present embodiment, the communication unit 207 performs data transmission/reception with an external apparatus using a wireless LAN and/or a portable communication network interface (3G/LTE). Furthermore, when performing wireless communication with the digital camera 101, the communication unit 207 functions as a station of the wireless LAN, thereby connecting to a created wireless network. Although not illustrated in the drawing, the portable terminal 201 includes a control unit. The control unit comprehensively controls the operations of the elements provided in the portable terminal 201 based on the control program stored in the storage unit 206. In expressing the present invention, indispensable elements of the portable terminal 201 are the imaging unit 202, the decoding unit 203, the storage unit 206, the generation unit 204, and the communication unit 207.

Figure 3:
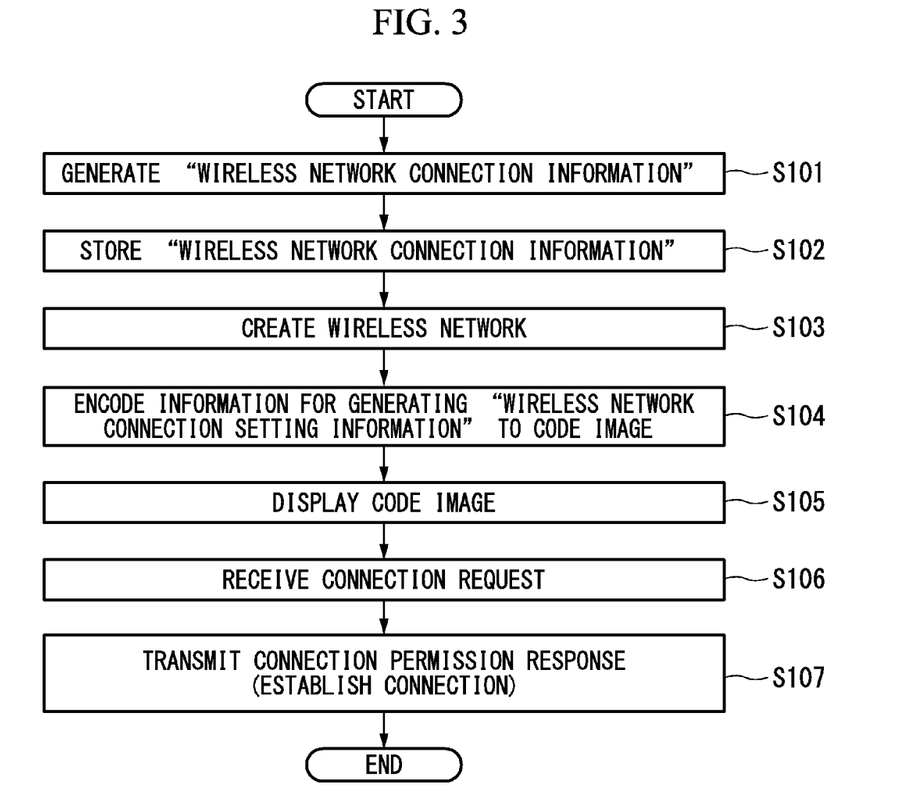
FIG. 3 is a flowchart illustrating an operation procedure of a digital camera when creating a wireless network in the first embodiment of the present invention.

Next, an operation procedure of the digital camera 101 when creating the wireless network will be described. FIG. 3 is a flowchart illustrating the operation procedure of the digital camera 101 when creating the wireless network in the present embodiment.

(Step S101) The generation unit 103 reads the information for generating "wireless network connection setting information" and the predetermined generation rule from the storage unit 102. Next, based on the predetermined generation rule read from the storage unit 102, the generation unit 103 generates the "wireless network connection setting information" from the information (the first information) for generating "wireless network connection setting information," which has been read from the storage unit 102. Then, the procedure proceeds to step S102.

The "wireless network connection setting information" includes a network identifier (SSID) and a password (a pass phrase). Furthermore, the information for generating "wireless network connection setting information" is basic data for generating the "wireless network connection setting information," and includes one of the following in the present embodiment.

Model name
Serial number
MAC address
Random value

Furthermore, in a process of step S204 which will be described later, the encoding unit 104 encodes (generates) a code image using the information for generating "wireless network connection setting information." An example of the predetermined generation rule will be described later.

(Step S102) The storage unit 102 stores the wireless network connection setting information (SSID and a password) generated by the generation unit 103 in the process of step S101. Then, the procedure proceeds to step S103.

(Step S103) The communication unit 107 creates a wireless network using the wireless network connection setting information stored in the storage unit 102. Then, the procedure proceeds to step S104. A creation method of the wireless network is the same as a creation method of a wireless network in a general WLAN.

(Step S104) The encoding unit 104 encodes the code image using the information for generating "wireless network connection setting information," which is stored in the storage unit 102.

(Step S105) Furthermore, the display unit 105 displays the code image encoded by the encoding unit 104. Then, the procedure ends. As the code image encoded by the encoding unit 104, a QR code (registered trademark) is used in the present embodiment.

(Step S106) The communication unit 107 receives a connection request (Association Request) to the wireless network created in step S103 from the portable terminal 201.

(Step S107) The communication unit 107 sends a connection permission response (Association Response) to the received connection request, thereby establishing a connection to the portable terminal 201.

Next, the predetermined generation rule stored in the storage unit 102 will be described, Hereinafter, five types of predetermined generation rules will be described.

(Generation Rule 1)
When the information for generating "wireless network connection setting information" is set as a model name and a serial number, a generation rule of the "wireless network connection setting information" is as follows.

The generation rule of the "wireless network connection setting information":
SSID: Model name+"_"+serial number
Password: Value obtained by reversing the lower 10 digits of a serial number For example, in the case in which the model name is set as "foo_camera" and the serial number is set as "FEDCBA9876543210," when the storage unit 102 stores "generation rule 1" as the predetermined generation rule, the generation unit 103 generates, as the "wireless network connection setting information":
SSID: "foo_camera_FEDCBA9876543210"
Password: "0123456789."

(Generation Rule 2)
When the information for generating "wireless network connection setting information" is set as a model name, a serial number, and a MAC address, the generation rule of the "wireless network connection setting information" is as follows.

The generation rule of the "wireless network connection setting information":
SSID: Model name+"_"+serial number
Password: Value obtained by reversing the MAC address For example, in the case in which the model name is set as "foo_camera," the serial number is set as "FEDCBA9876543210," and the MAC address is set as "001122334455," when the storage unit 102 stores "generation rule 2" as the predetermined generation rule, the generation unit 103 generates, as the "wireless network connection setting information":
SSID: "foo_camera_FEDCBA9876543210"
Password: "554433221100".

(Generation Rule 3)
When the information for generating "wireless network connection setting information" is set as a model name, a serial number, and a random value, the generation rule of the "wireless network connection setting information" is as follows. The generation rule of the "wireless network connection setting information":
SSID: Model name+"_"+serial number
Password: Value obtained by reversing a random value For example, in the case in which the model name is set as "foo_camera," the serial number is set as "FEDCBA9876543210," and the random value is set as "A5F941AD," when the storage unit 102 stores "generation rule 3" as the predetermined generation rule, the generation unit 103 generates, as the "wireless network connection setting information":
SSID: "foo_camera_FEDCBA9876543210"
Password: "DA149F5A".

(Generation Rule 4)
When the information for generating "wireless network connection setting information" is set as a model name, a serial number, and a random value, the generation rule of the "wireless network connection setting information" is as follows.

The generation rule of the "wireless network connection setting information":
SSID: Model name+"_"+serial number
Password: Hash value (MD5) of a random value For example, in the case in which the model name is set as "foo_camera," the serial number is set as "FEDCBA9876543210," and the random value is set as "100," when the storage unit 102 stores "generation rule 4" as the predetermined generation rule, the generation unit 103 generates, as the "wireless network connection setting information":
SSID: "foo_camera_FEDCBA9876543210"
Password: "f899139df5e1059396431415e770c6dd".

(Generation Rule 5)
When the information for generating "wireless network connection setting information" is set as a model name, a serial number, and a random value, the generation rule of the "wireless network connection setting information" is as follows.

Figure 4:
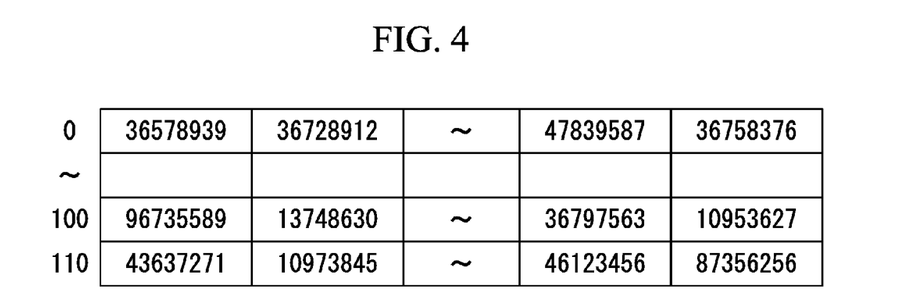
FIG. 4 is a schematic diagram illustrating a data example of a password table in the first embodiment of the present invention.

The generation rule of the "wireless network connection setting information":
SSID: Model name+"_"+serial number
Password: Acquired by offsetting a random value from a password table For example, in the case in which the model name is set as "foo_camera," the serial number is set as "FEDCBA9876543210," and the random value is set as "100," it is assumed that the storage unit 102 stores "generation rule 5" as the predetermined generation rule, and stores the password table illustrated in FIG. 4 as the password table. FIG. 4 is schematic diagram illustrating a data example of a password table in the present embodiment. The password table stores passwords corresponding to random values. In the illustrated example, the password table stores "96735589" as a password corresponding to the random value "100." Passwords corresponding to other random values are as illustrated in FIG. 4.

In this case, the generation unit 103 generates, as the "wireless network connection setting information":
SSID: "foo_camera_FEDCBA9876543210"
Password: "96735589".

The five types of predetermined generation rules have been described above. However, the predetermined generation rule is not limited to the aforementioned five types of predetermined generation rules, and any generation rules may be used. For example, the information for generating "wireless network connection setting information" may be a combination of values of any one of the serial number, the MAC address, and the random value, and the "wireless network connection setting information" may be generated using this value. Furthermore, in any case, it is assumed that the storage unit 102 of the digital camera 101 and the storage unit 206 of the portable terminal 201 store the same predetermined generation rule.

Next, a description will be provided for an example in which the information for generating "wireless network connection setting information" is encoded into a code image. For example, it is assumed that the information for generating "wireless network connection setting information" is set as a model name of "foo_camera," a serial number of "FEDCBA9876543210," and a random value of "100."

In this case, information to be encoded is the following text information.
MN: foo_camera
SN: FEDCBA9876543210
RN: 100

Figure 5:
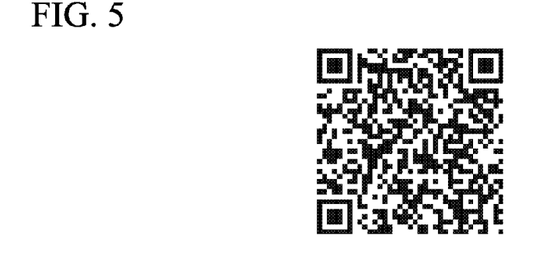
FIG. 5 is a schematic diagram illustrating an example of a QR code (registered trademark) encoded by an encoding unit in the first embodiment of the present invention.

The encoding unit 104 encodes the text into a QR code (registered trademark). FIG. 5 is a schematic diagram illustrating an example of the QR code (registered trademark) encoded by the encoding unit 104 in the present embodiment.

Figure 6:
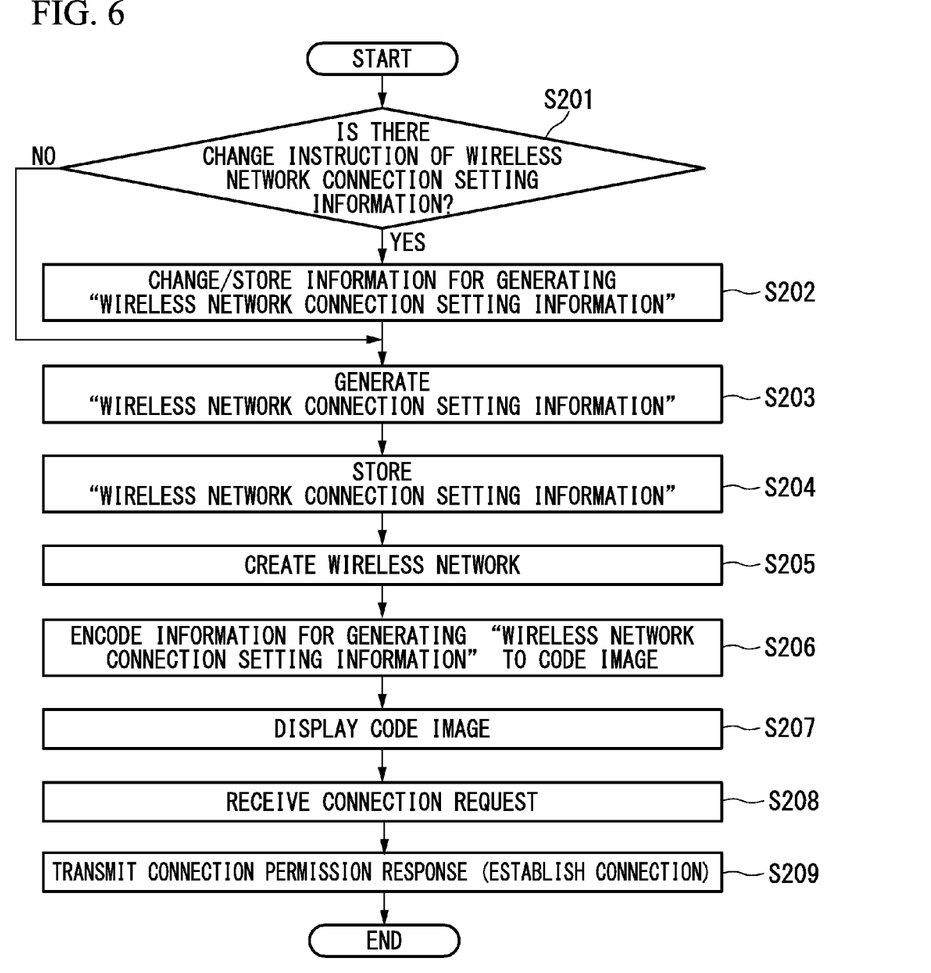
FIG. 6 is a flowchart illustrating an operation procedure when a digital camera having a function of changing wireless network connection setting information creates a wireless network in the first embodiment of the present invention.

The digital camera 101 may be configured to be able to change the wireless network connection setting information by an instruction of a user. FIG. 6 is a flowchart illustrating an operation procedure when the digital camera 101 having a function of changing the wireless network connection setting information creates a wireless network in the present embodiment.

(Step S201) The input unit 106 determines whether input of a change instruction of the "wireless network connection setting information" has been accepted. When the input unit 106 determines that the input of the change instruction of the "wireless network connection setting information" has been accepted, the procedure proceeds to a process of step S202. Otherwise, the procedure proceeds to a process of step S203.

(Step S202) The storage unit 102 changes the stored information for generating "wireless network connection setting information" based on the change instruction of the "wireless network connection setting information," which has been accepted in the input unit 106 in the process of step S201. For example, when a random value is used as the information for generating "wireless network connection setting information," the storage unit 102 changes the random value to a new random value. Subsequently, the procedure proceeds to the process of step S203.

Processes of step S203 to step S209 are the same as the processes of step S101 to step S107.

Figure 7:
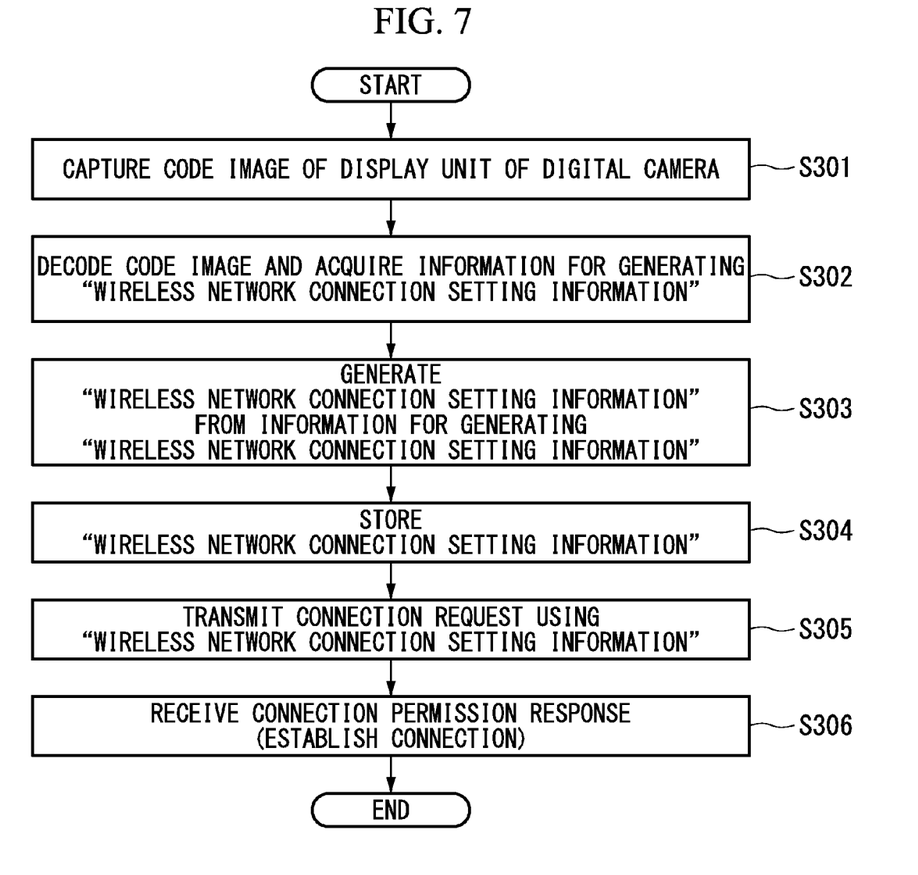
FIG. 7 is a flowchart illustrating an operation procedure of a portable terminal when connecting to a wireless network in the first embodiment of the present invention.

Next, an operation procedure of the portable terminal 201 when connecting to the wireless network will be described.
FIG. 7 is a flowchart illustrating the operation procedure of the portable terminal 201 when connecting to the wireless network in the present embodiment.

(Step S301) The imaging unit 202 captures the code image displayed by the display unit 105 of the digital camera 101. Subsequently, the procedure proceeds to a process of step S302.

(Step S302) The decoding unit 203 decodes the code image captured by the imaging unit 202 in the process of step S301, and acquires the information for generating "wireless network connection setting information." Subsequently, the procedure proceeds to a process of step S303.

(Step S303) The generation unit 204 reads the predetermined generation rule stored in the storage unit 206. Then, based on the read predetermined generation rule, the generation unit 204 generates the "wireless network connection setting information" from the information for generating "wireless network connection setting information" acquired by the decoding unit 203 in the process of step S302. Subsequently, the procedure proceeds to a process of step S304.

(Step S304) The storage unit 206 stores the "wireless network connection setting information" generated by the generation unit 204 in the process of step S303. Subsequently, the procedure proceeds to a process of step S305.

(Step S305) The communication unit 207 detects the digital camera 101, which is a connection target using the "wireless network connection setting information" stored in the storage unit 206 in the process of step S304 in order to connect to the created wireless network of the digital camera 101, and transmits a connection request (Association Request) to the detected digital camera 101.

(Step S306) Then, when a connection permission response (Association Response) is received from the digital camera 101, the communication unit 207 establishes a connection to the wireless network and ends the procedure.

Next, a description of a detailed process of the digital camera 101 when connecting to the created wireless network of the digital camera 101 will be provided. Hereinafter, a description will be provided using an example in which the display unit 105 of the digital camera 101 displays the QR code (registered trademark) illustrated in FIG. 5, and the storage unit 102 of the digital camera 101 and the storage unit 206 of the portable terminal 201 store the aforementioned "generation rule 4" as the predetermined generation rule.

The imaging unit 202 of the portable terminal 201 captures the QR code (registered trademark) displayed on the display unit 105 of the digital camera 101. In this way, the imaging unit 202 captures the QR code (registered trademark) illustrated in FIG. 5. Next, the decoding unit 203 of the portable terminal 201 decodes the QR code (registered trademark) captured by the imaging unit 202. From the QR code (registered trademark) illustrated in FIG. 5, the following text data is decoded.
MN: foo_camera
SN: FEDCBA9876543210
RN: 100

Through the text data, the decoding unit 203 acquires the following information for generating "wireless network connection setting information".
Model name=foo_camera
Serial number=FEDCBA9876543210
Random value=100

When a description format of the information for generating "wireless network connection setting information" decoded by the decoding unit 203 differs or incorrect information has been set, the subsequent processes (the processes after step S303) are stopped (no connection request is transmitted to the digital camera 101). At this time, the display unit 205 may display an alarm message for a user. As a case of stopping the processes, the following example is considered.

A fixed character string of "SN:" or "RN:" does not exist or different character string exists The numbers of digits of serial numbers or random values differ.

Next, the generation unit 204 of the portable terminal 201 reads "generation rule 4" stored in the storage unit 206. Then, the generation unit 204 generates the "wireless network connection setting information" from the above information for generating "wireless network connection setting information" based on the read "generation rule 4." In this way, the generation unit 204 generates the following "wireless network connection setting information."

SSID="foo_camera_FEDCBA987654321
Password="f899139df5e1059396431415e770c6dd"

The password is a hash value (MD5) of the random value 100.

Then, the communication unit 207 of the portable terminal 201 connects to the created wireless network of the digital camera 101 using the SSID and the password that are the "wireless network connection setting information" generated by the generation unit 204.

As described above, according to the present embodiment, the predetermined generation rule for generating the wireless network connection setting information, which is stored in the storage unit 102 of the digital camera 101, is the same as the predetermined generation rule for generating the wireless network connection setting information, which is stored in the storage unit 206 of the portable terminal 201. Consequently, the portable terminal 201 captures the code image displayed on the display unit 105 of the digital camera 101 and performs the aforementioned processes, thereby generating the wireless network connection setting information based on the predetermined generation rule. In this way, it is possible to connect to the created wireless network of the digital camera 101 using the wireless network connection setting information generated by the portable terminal 201.

In addition, when another portable terminal having not recognized the predetermined generation rule images the code image displayed on the display unit 105 of the digital camera 101, the other portable terminal is not able to generate the wireless network connection setting information from the information for generating "wireless network connection setting information" because it has not recognized the predetermined generation rule. Accordingly, it is possible to maintain simplicity of wireless network connection setting while enhancing the security of information at the time of the wireless network connection setting.

Second Embodiment

Next, a second embodiment of the present invention will be described. The second embodiment is different from the first embodiment in that a server being remote from the portable terminal generates the wireless network connection setting information. A system including a digital camera, a portable terminal, and a server is assumed to be a wireless communication system.

Figure 8:
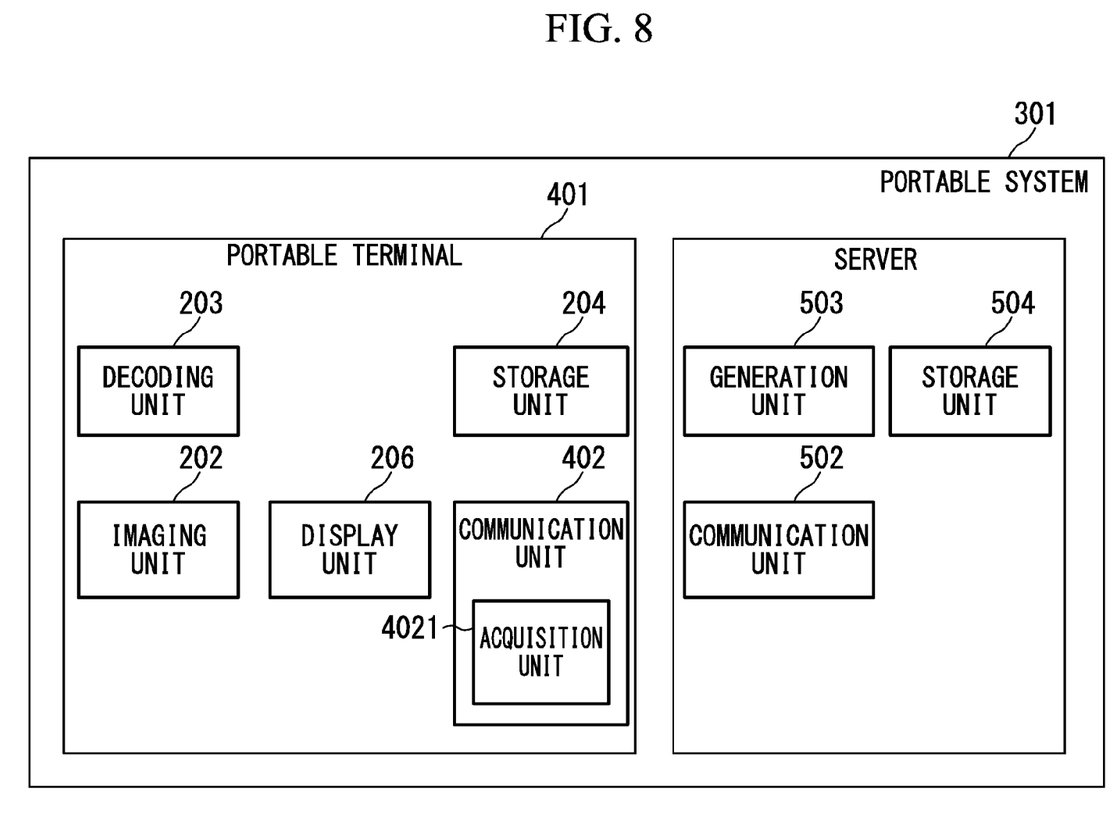
FIG. 8 is a block diagram illustrating the constitution of a portable system in a second embodiment of the present invention.

The constitution of a digital camera 101 in the present embodiment is the same as that of the digital camera 101 in the first embodiment. FIG. 8 is a block diagram illustrating the constitution of a portable system in the present embodiment. In the illustrated example, a portable system 301 includes a portable to terminal 401 and a server 501. The portable terminal 401 includes an imaging unit 202, a decoding unit 203, a storage unit 206, a display unit 205, and a communication unit 402. The communication unit 402 includes an acquisition unit 4021.

The imaging unit 202, the decoding unit 203, the storage unit 206, and the display unit 205 are the same as the elements in the first embodiment. The communication unit 402 is a communication interface that performs data transmission/reception with an external apparatus including the digital camera 101 and the server 501. In the present embodiment, the communication unit 402 performs data transmission/reception with an external apparatus using a wireless LAN and/or a portable communication network (3 G/LTE). Furthermore, when performing wireless communication with the digital camera 101, the communication unit 402 functions as a station of the wireless LAN, thereby connecting to a created wireless network. The communication unit 402 transmits information for generating "wireless network connection setting information" decoded by the decoding unit 203 to the server 501 through the wireless LAN and/or the portable communication network (3G/LTE), and thereby the acquisition unit 4021 acquires "wireless network connection setting information" that is generated by the server 501. Although not illustrated in the drawing, the portable terminal 401 includes a control unit. The control unit comprehensively controls the operations of the elements provided in the portable terminal 401 based on a control program stored in the storage unit 206.

The server 501 includes a communication unit 502 (a reception unit, a transmission unit), a storage unit 504 (a second storage unit), and a generation unit 503 (a second generation unit). The communication unit 502 is a communication interface that performs data transmission/reception with an external apparatus including the portable terminal 401. In the present embodiment, the communication unit 502 performs data transmission/reception using a wired or wireless LAN. Furthermore, the communication unit 502 is also able to perform data transmission/reception with a portable communication network. The communication unit 502 receives the information for generating "wireless network connection setting information," which is transmitted from the portable terminal 401. Furthermore, the communication unit 502 transmits, to the portable terminal 401, "wireless network connection setting information" which is generated by the generation unit 503 and stored in the storage unit 504.

The storage unit 504 stores a predetermined generation rule for generating the wireless network connection setting information. Furthermore, the storage unit 504 stores the wireless network connection setting information that is generated by the generation unit 503. Furthermore, the storage unit 504 also stores a control program for comprehensively controlling operations of the elements provided in the server 501, data that is transmitted/received by the communication unit 502, and the like. The predetermined generation rule for generating the wireless network connection setting information, which is stored in the storage unit 504, is the same as the predetermined generation rule for generating the wireless network connection setting information, which is stored in the storage unit 102 of the digital camera 101.

The generation unit 503 generates the wireless network connection setting information from the information for generating "wireless network connection setting information," which is received in the communication unit 502, by the predetermined generation rule for generating the wireless network connection setting information, which is stored in the storage unit 504. Although not illustrated in the drawing, the server 501 includes a control unit. The control unit comprehensively controls the operations of the elements provided in the server 501 based on the control program stored in the storage unit 504. Indispensable elements of the server 501 are the communication unit 502, the storage unit 504, and the generation unit 503.

Next, an operation procedure of the digital camera 101 when creating a wireless network will be described. The operation procedure when the digital camera 101 creates the wireless network in the present embodiment is the same as the operation procedure when the digital camera 101 creates the wireless network in the first embodiment.

Figure 9:
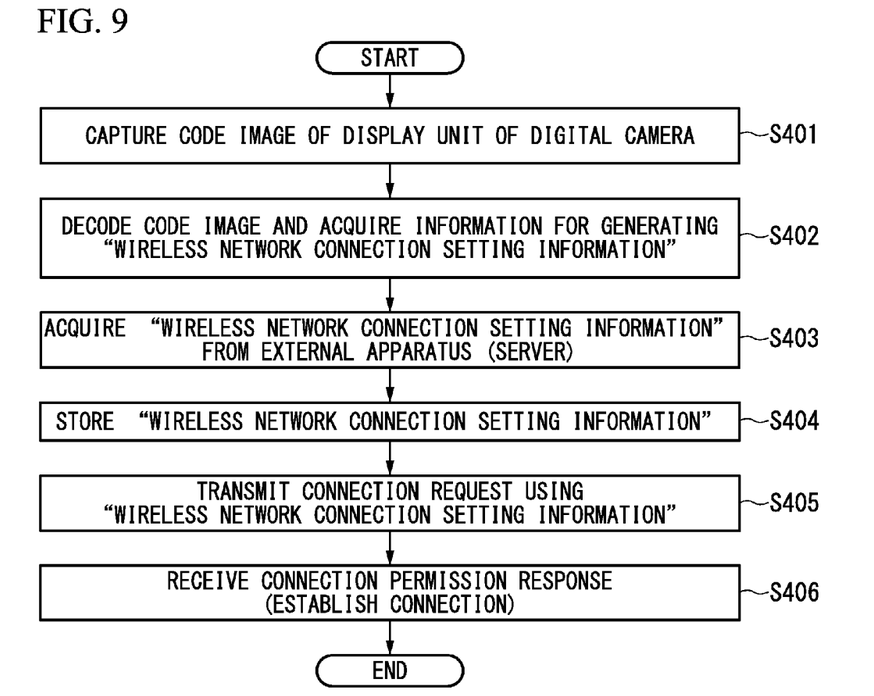
FIG. 9 is a flowchart illustrating an operation procedure of a portable terminal when the portable terminal connects to a wireless network in the second embodiment of the present invention.

Next, an operation procedure of the portable terminal 401 when the portable terminal 401 connects to the wireless network will be described. FIG. 9 is a flowchart illustrating the operation procedure of the portable terminal 401 when the portable terminal 401 connects to the wireless network in the present embodiment. Step S401 to step S402 are the same as step S301 to step S302 in the first embodiment.

(Step S403) The acquisition unit 4021 transmits, to the server 501, an HTTP request (an acquisition request of "wireless network connection setting information") including the information for generating "wireless network connection setting information", which has been generated in the decoding unit 203 in the process of step S402. Then, the acquisition unit 4021 receives the "wireless network connection setting information" that is transmitted from the server 501. Subsequently, the procedure proceeds to a process of step S404.

For example, the information for generating "wireless network connection setting information," which has been generated in the decoding unit 203, is as follows.

Model name=foo_camera
Serial number=FEDCBA9876543210
Random value=100

In this case, the HTTP request transmitted from the acquisition unit 4021 to the server 501 is as follows.

GET http://www.foo.com/wlan_setting?MN=foo_camera&SN=FEDCBA9876543210&RN=100 HTTP/1.1

The HTTP request is an acquisition request of the "wireless network connection setting information" that is generated using the model name (MN), the serial number (SN), and the random value (RN) as parameters.

Processes of step S404 to step S406 are the same as the processes of step S304 to step S306 in the first embodiment.

Figure 10:
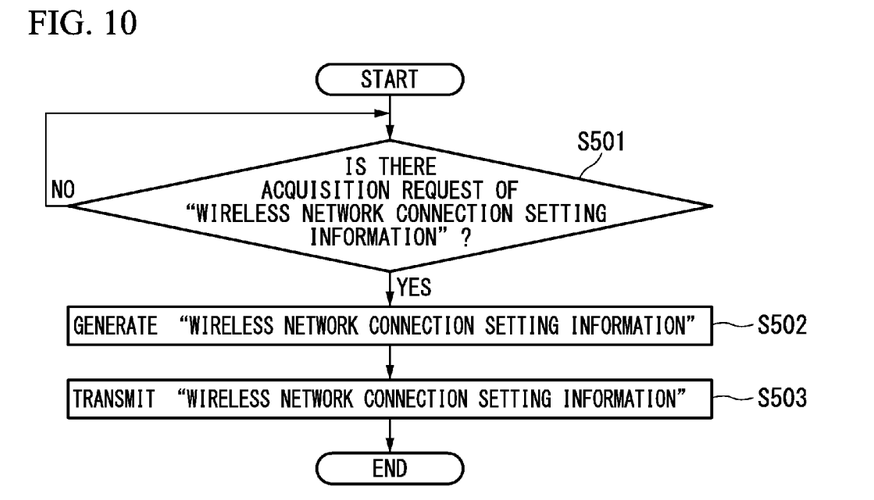
FIG. 10 is a flowchart illustrating an operation procedure of a server when a portable terminal connects to a wireless network in the second embodiment of the present invention.

Next, an operation procedure of the server 501 when the portable terminal 401 connects to the wireless network will be described. FIG. 10 is a flowchart illustrating the operation procedure of the server 501 when the portable terminal 401 connects to the wireless network in the present embodiment.

(Step S501) The communication unit 502 determines whether the HTTP request (the acquisition request of the "wireless network connection setting information") including the information for generating "wireless network connection setting information," which is transmitted from the portable terminal 401, has been received. When the communication unit 502 determines that the HTTP request including the information for generating "wireless network connection setting information," which is transmitted from the portable terminal 401, has been received, the procedure proceeds to a process of step S502. In other cases, the process of step S501 is performed again.

For example, the HTTP request is as follows.

GET http://www.foo.com/wlan_setting?MN=foo_camera&SN=FEDCBA9876543210&RN-100 HTTP/1.1

In this case, the information for generating "wireless network connection setting information" is as follows.

Model name: foo_camera
Serial number: FEDCBA9876543210
Random value: 100

(Step S502) The generation unit 503 reads the predetermined generation rule stored in the storage unit 504. Then, based on the read predetermined generation rule, the generation unit 503 generates the "wireless network connection setting information" from the information for generating "wireless network connection setting information," which has been received in the communication unit 502 in the process of step S501. Subsequently, the procedure proceeds to a process of step S503.

(Step S503) The storage unit 504 stores the "wireless network connection setting information" generated by the generation unit 503 in the process of step S502. Then, the communication unit 502 transmits the "wireless network connection setting information" stored in the storage unit 504 to the portable terminal 401.

Then, the procedure ends.

As described above, according to the present embodiment, the predetermined generation rule for generating the wireless network connection setting information which is stored in the storage unit 102 of the digital camera 101 is the same as the predetermined generation rule for generating the wireless network connection setting information which is stored in the storage unit 504 of the server 501. Consequently, the portable terminal 401 captures the code image displayed on the display unit 105 of the digital camera 101 and transmits the information for generating "wireless network connection setting information" acquired by decoding the code image to the server 501, so that the server 501 is able to generate the wireless network connection setting information based on the predetermined generation rule. Furthermore, the server 501 transmits the generated wireless network connection setting information to the portable terminal 401, so that the portable terminal 401 is able to connect to the created wireless network of the digital camera 101 using the wireless network connection setting information, which has been received from the server 501.

In addition, when the server 501 having not recognized the predetermined generation rule receives the information for generating "wireless network connection setting information" from the digital camera 101, the server 501 is not able to generate the wireless network connection setting information. Accordingly, it is possible to maintain simplicity of wireless network connection setting while enhancing the security of information at the time of the wireless network connection setting.

Furthermore, in the present embodiment, the server 501 generates the wireless network connection setting information, so that it is possible to reduce a processing load of the portable terminal 401.

So far, the first and the second embodiments of the present invention have been described in detail with reference to the accompanying drawings. However, detailed configurations are not limited to the aforementioned configurations. For example, various design modifications can be made without departing from the scope of the present invention.

For example, information encoded in the code image displayed on the display unit 105 of the digital camera 101 has a format recognizable only by a specific application of the portable terminal 401. Thus, if a general code image decoding application (in detail, a QR code (registered trademark) reader) tries to decode the present code image, the general code image decoding application is not able to recognize the content. Accordingly, since the general code image decoding application is not able to provide a user with accurate information such as an instruction on a next operation or an alarm, the general code image decoding application merely displays decoded text information under normal conditions. In this regard, information is added to the code image, so that accurate information may be provided to a user. In detail, the encoding unit 104 of the digital camera 101 encodes the following information to generate the code image.

MN: foo_camera
SN: FEDCBA9876543210
RN: DA149F5A

The present QR code (registered trademark) is available only in a dedicated application. Download: http://www.foo.com/wlan_setting_app In this way, even when the present code image is decoded by the general code image decoding application, decoded text is displayed, so that it is possible to provide a user with accurate information. In the above case, it is possible to provide information requiring a dedicated application.

The whole or a part of the functions of each element provided in the aforementioned digital camera 101, portable terminals 201 and 401, and server 501 may be performed by recording a program for performing the functions on a computer-readable storage medium, and allowing the program recorded on the storage medium to be read in a computer system. The "computer system" described herein is assumed to include an OS and hardware such as peripheral devices.

Furthermore, the "computer-readable storage medium" refers to a portable medium such as a flexible disk, a magnetic optical disc, a ROM, or a CD-ROM, or a recording unit such as a hard disk embedded in a computer system. Moreover, the "computer-readable storage medium" may include a medium for dynamically holding a program for a short time, as with a communication line in the case of transmitting the program through a network such as the Internet or a communication line such as a telephone line, and a medium for holding a program for a constant time, as with a volatile memory in a computer system serving as a server or a client in that case. Furthermore, the program may include a program for performing part of the aforementioned function, or a program for performing the aforementioned function in combination with a program already recorded in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication system comprising:
   a first memory configured to store first information, which is used to generate wireless network connection setting information that is used to connect to a wireless network, and a conversion rule of the first information and the wireless network connection setting information, wherein the wireless network connection setting information, which includes a network identifier and a password, is not contained in the first information;
   a first generator stored in the first memory when executed by a first processor configured to generate the wireless network connection setting information from the first information, which is stored in the first memory, based on the conversion rule stored in the first memory;
   an encoder stored in the first memory when executed by the first processor configured to encode the first information to generate a code image;
   a display configured to display the code image generated by the encoder;
   a hardware imager configured to capture the code image displayed on the display;
   a decoder stored in a second memory when executed by a second processor configured to decode the code image captured by the imager and acquires the first information;
   the second memory configured to store a conversion rule that is the same as the conversion rule stored in the first memory;
   a second generator stored in the second memory when executed by the second processor configured to generate the wireless network connection setting information from the first information, which is acquired by the decoder, based on the conversion rule stored in the second memory;
   a transceiver configured to transmit a connection request for connecting to the wireless network using the wireless network connection setting information generated by the second generator; and
   a second transceiver configured to perform a process of connecting to the wireless network in response to the connection request.

2. The wireless communication system according to claim 1, further comprising:
   a digital camera including the first memory, the first generator, the encoder, the display, and the second transceiver; and
   a portable terminal including the imager, the decoder, the second memory, the second generator, and the transceiver.

3. The wireless communication system according to claim 1, further comprising:
   a server,
   a digital camera including the first memory, the first generator, the encoder, the display, and the second transceiver; and
   a portable terminal including the imager, the decoder, and the transceiver,
   wherein the transceiver is further configured to transmit the first information acquired by the decoder to the server,
   the server comprises:
   a receiver configured to receive the first information that is transmitted from the transceiver;
   the second memory;
   the second generator; and
   a transmitter configured to transmit the wireless network connection setting information generated by the second generator to the portable terminal,
   the transceiver further receives the wireless network connection setting information that is transmitted from the transmitter.

4. The wireless communication system according to claim 1, wherein, when the first information decoded by the decoder is not a predetermined value, the transceiver stops a process of transmitting the connection request.

5. The wireless communication system according to claim 4, further comprising:
   a second display configured to display an alarm for alerting that the process is stopped when the transceiver stops the process of transmitting the connection request.

6. A portable terminal comprising:
   a hardware imager configured to capture a code image, which is obtained by encoding first information, which generates, when conversion based on a predetermined conversion rule is performed, wireless network connection setting information that is used to connect to a wireless network, wherein the wireless network connection setting information, which includes a network identifier and a password, is not contained in the first information;

a decoder stored in a memory when executed by a processor configured to decode the code image captured by the imager so as to acquire the first information;

a terminal memory configured to store a conversion rule that is the same as the predetermined conversion rule;

a terminal generator stored in the memory when executed by the processor configured to generate the wireless network connection setting information from the first information, which is acquired by the decoder, based on the conversion rule stored in the terminal memory; and a transceiver communication unit configured to transmit a connection request for connecting to the wireless network using the wireless network connection setting information generated by the terminal generator.

7. The portable terminal according to claim 6, wherein, when the first information decoded by the decoder is not a predetermined value, the transceiver stops a process of transmitting the connection request.

8. The portable terminal according to claim 7, further comprising:

a display configured to display an alarm for alerting that the process is stopped when the transceiver stops the process of transmitting the connection request.

9. A digital camera comprising:

a first memory configured to store first information, which is used to generate wireless network connection setting information that is used to connect to a wireless network, and a conversion rule of the first information and the wireless network connection setting information, wherein the wireless network connection setting information, which includes a network identifier and a password, is not contained in the first information;

a first generator stored in the first memory when executed by a first processor configured to generate the wireless network connection setting information from the first information, which is stored in the first memory, based on the conversion rule stored in the first memory;

an encoder stored in the first memory when executed by the first processor configured to encode the first information to generate a code image;

a display configured to display the code image generated by the encoder; and a transceiver communication unit configured to receive a connection request to the wireless network and performs a process of connecting to the wireless network in response to the connection request.

10. A communication method comprising:

an imaging step of capturing a code image, which is obtained by encoding first information, which generates, when conversion based on a predetermined conversion rule is performed, wireless network connection setting information that is used to connect to a wireless network, wherein the wireless network connection setting information, which includes a network identifier and a password, is not contained in the first information;

a decoding step of decoding the code image captured in the imaging step so as to acquire the first information;

a generation step of generating the wireless network connection setting information from the first information, which is acquired in the decoding step, based on a conversion rule that is stored in a terminal memory that stores the conversion rule that is the same as the predetermined conversion rule; and a communication step of transmitting a connection request for connecting to the wireless network using the wireless network connection setting information generated in the generation step.

11. A communication method comprising:

a generation step of generating wireless network connection setting information from first information, which is stored in a first memory, based on a conversion rule stored in the first memory that stores the wireless network connection setting information that is used to connect to a wireless network, the first information that is used to generate the wireless network connection setting information, and the conversion rule between the first information and the wireless network connection setting information, wherein the wireless network connection setting information, which includes a network identifier and a password, is not contained in the first information;

an encoding step of encoding the first information to generate a code image;

a display step of displaying the code image generated in the encoding step; and a communication step of receiving a connection request to the wireless network and performing a process of connecting to the wireless network in response to the connection request.

12. A computer-readable storage device that records a program for causing a computer including a hardware imager to perform:

an imaging step of capturing, by the imager, a code image, which is obtained by encoding first information, which is able to be used to generate wireless network connection setting information that is used to connect to a wireless network when conversion based on a predetermined conversion rule is performed, wherein the wireless network connection setting information, which includes a network identifier and a password, is not contained in the first information;

a decoding step of decoding the code image captured by the imager in the imaging step and acquiring the first information;

a generation step of generating the wireless network connection setting information from the first information, which is acquired in the decoding step, based on the conversion rule that is stored in a terminal memory that stores the conversion rule that is the same as the predetermined conversion rule; and a communication step of transmitting a connection request for connecting to the wireless network using the wireless network connection setting information generated in the generation step.

13. A computer-readable storage device that records a program for causing a computer to perform:

a generation step of generating wireless network connection setting information from first information, which is stored in a first memory, based on a conversion rule stored in the first memory that stores the wireless network connection setting information that is used to connect to a wireless network, the first information that is used to generate the wireless network connection setting information, and the conversion rule of the first information and the wireless network connection setting information, wherein the wireless network connection setting information, which includes a network identifier and a password, is not contained in the first information;

an encoding step of encoding the first information to generate a code image;
a display step of displaying the code image generated in the encoding step; and
a communication step of receiving a connection request to the wireless network and performing a process of connecting to the wireless network in response to the connection request.

14. A wireless communication system comprising:
a first memory configured to store first information, which is used to generate wireless network connection setting information that is used to connect to a wireless network, and a conversion rule of the first information and the wireless network connection setting information, wherein the wireless network connection setting information, which includes a network identifier and a password, is not contained in the first information;
a first generator hardware configured to generate the wireless network connection setting information from the first information, which is stored in the first memory, based on the conversion rule stored in the first memory;
an encoder hardware configured to encode the first information to generate a code image;
a display configured to display the code image generated by the encoder;
a hardware imager configured to capture the code image displayed on the display;
a decoder hardware configured to decode the code image captured by the imager and acquires the first information;
the second memory configured to store a conversion rule that is the same as the conversion rule stored in the first memory;
a second generator hardware configured to generate the wireless network connection setting information from the first information, which is acquired by the decoder, based on the conversion rule stored in the second memory;
a transceiver configured to transmit a connection request for connecting to the wireless network using the wireless network connection setting information generated by the second generator; and
a second transceiver configured to perform a process of connecting to the wireless network in response to the connection request.

15. A portable terminal comprising:
a hardware imager configured to capture a code image, which is obtained by encoding first information, which generates, when conversion based on a predetermined conversion rule is performed, wireless network connection setting information that is used to connect to a wireless network, wherein the wireless network connection setting information, which includes a network identifier and a password, is not contained in the first information;
a hardware decoder configured to decode the code image captured by the imager so as to acquire the first information;
a terminal memory configured to store a conversion rule that is the same as the predetermined conversion rule;
a terminal generator hardware configured to generate the wireless network connection setting information from the first information, which is acquired by the decoder, based on the conversion rule stored in the terminal memory; and
a transceiver configured to transmit a connection request for connecting to the wireless network using the wireless network connection setting information generated by the terminal generator.

16. A digital camera comprising:
a first memory configured to store first information, which is used to generate wireless network connection setting information that is used to connect to a wireless network, and a conversion rule of the first information and the wireless network connection setting information, wherein the wireless network connection setting information, which includes a network identifier and a password, is not contained in the first information;
a first generator hardware configured to generate the wireless network connection setting information from the first information, which is stored in the first memory, based on the conversion rule stored in the first memory;
an hardware encoder configured to encode the first information to generate a code image;
a display configured to display the code image generated by the encoder; and a transceiver configured to receive a connection request to the wireless network and performs a process of connecting to the wireless network in response to the connection request.

* * * * *